(12) United States Patent
Kennedy et al.

(10) Patent No.: US 7,427,049 B2
(45) Date of Patent: Sep. 23, 2008

(54) AIRCRAFT SEAT FLOOR TRACK FITTING

(75) Inventors: Othar Kennedy, Colorado Springs, CO (US); Don Pinkal, Colorado Springs, CO (US)

(73) Assignee: AMI Industries, Inc., Colorado Springs, CA (US)

( * ) Notice: Subject to any disclaimer, the term of this patent is extended or adjusted under 35 U.S.C. 154(b) by 266 days.

(21) Appl. No.: 11/492,539

(22) Filed: Jul. 24, 2006

(65) Prior Publication Data

US 2008/0017755 A1 Jan. 24, 2008

(51) Int. Cl.
*B64D 11/06* (2006.01)
*B64D 13/00* (2006.01)

(52) U.S. Cl. ............... 244/118.6; 244/118.5; 244/131; 410/105

(58) Field of Classification Search ............. 244/118.5, 244/118.6, 131, 137.1, 137.3; 70/261; 297/216, 297/249, 232; 410/104, 105, 77, 80; 403/374.1–374.4
See application file for complete search history.

(56) References Cited

U.S. PATENT DOCUMENTS

| 4,047,689 | A | 9/1977 | Grendahl | 248/503.1 |
|---|---|---|---|---|
| 4,062,298 | A | 12/1977 | Weik | 105/482 |
| 4,089,500 | A | 5/1978 | Gustafsson | 248/429 |
| 4,449,875 | A | 5/1984 | Brunelle | 410/80 |
| 4,496,271 | A | 1/1985 | Spinosa et al. | 410/105 |
| 4,911,381 | A | 3/1990 | Cannon et al. | 244/122 R |
| 4,913,489 | A | 4/1990 | Martin | 297/232 |
| 5,178,346 | A | 1/1993 | Beroth | 244/122 R |
| 5,236,153 | A * | 8/1993 | LaConte | 244/118.6 |
| 5,302,065 | A | 4/1994 | Vogg et al. | 411/85 |
| 5,816,110 | A | 10/1998 | Schuler et al. | 74/527 |
| 5,823,727 | A | 10/1998 | Lee | 411/85 |
| 5,871,318 | A * | 2/1999 | Dixon et al. | 410/105 |
| 5,975,822 | A | 11/1999 | Ruff | 411/553 |
| 6,149,118 | A | 11/2000 | Ruff | 248/418 |
| 6,637,712 | B1 | 10/2003 | Lagerweij | 248/429 |
| 6,736,458 | B2 | 5/2004 | Chabanne et al. | 297/344.1 |
| 6,902,365 | B1 | 6/2005 | Dowty | 410/105 |
| 7,021,596 | B2 | 4/2006 | Lory | 248/429 |

\* cited by examiner

*Primary Examiner*—Kimberly D Nguyen
*Assistant Examiner*—Michael Kreiner
(74) *Attorney, Agent, or Firm*—Jerry J. Holden; John D. Titus

(57) ABSTRACT

A floor track fitting for securing seating or other equipment to a section of aircraft floor track consists of a pair of substantially U-shaped cleat members and a captive bolt. The cleat members are inserted back-to-back through the holes in the floor track. Once the cleat members are in place, a cover is placed over the cleat members so that the captive bolt passes through the top of the cover. The inside of the cover has a pair of integral spaces that force the cleat members outward against the sides of the track channel holes so that the undercut portion of the cleat members locks onto the underside of the floor track. As the bolt is tightened it presses down on the cover and simultaneously draws the cleat members upward against the underside of the floor track to clamp the floor track firmly between the cleat members and the cover.

12 Claims, 4 Drawing Sheets

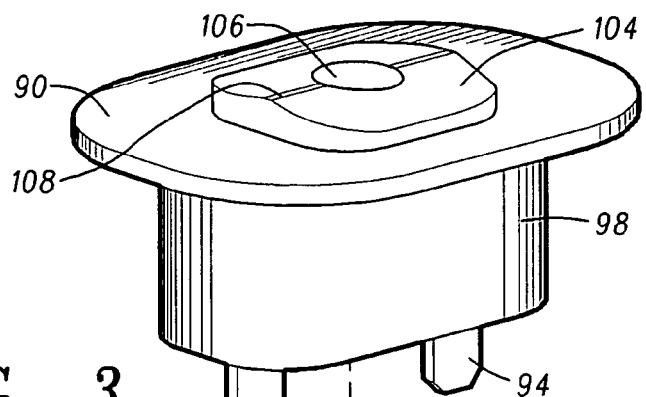
FIG. 3
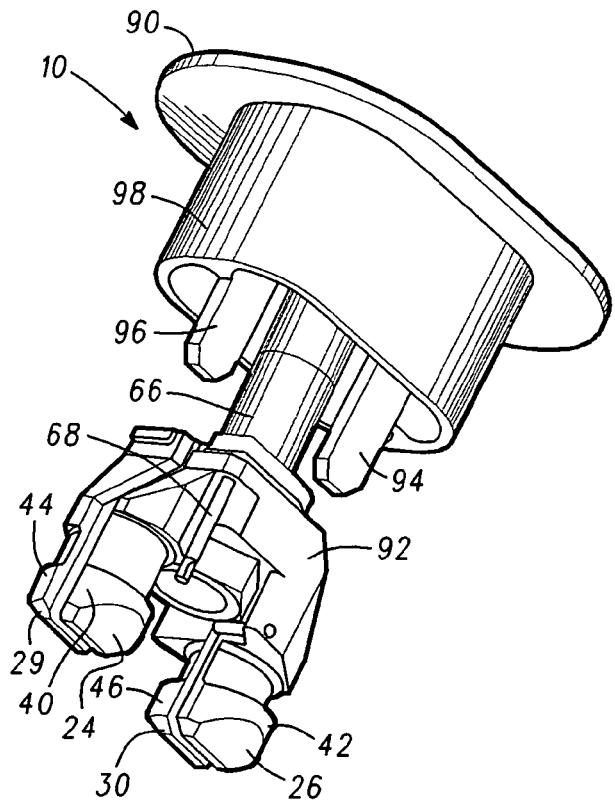
FIG. 4
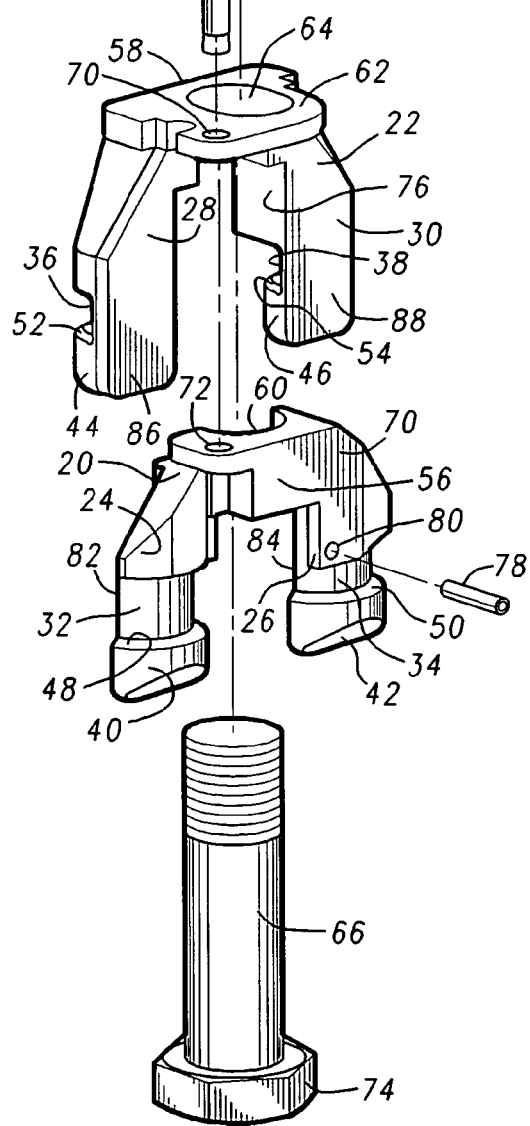

AIRCRAFT SEAT FLOOR TRACK FITTING

BACKGROUND OF THE INVENTION

This invention relates to aircraft interior equipment and more particularly, to fittings for releasably securing seating and other equipment in aircraft.

In the manufacture and fitting out of aircraft, purchasers of the same basic aircraft model may require different seating or equipment arrangements. Accordingly, aircraft manufacturers typically supply aircraft with a standard floor track channel that permits seating, bulkheads, or other equipment to be mounted in any number of selectable locations. The seating, bulkheads, or other equipment are mounted to the floor track using releasable fittings. These fittings allow the equipment to be rearranged during the lifetime of the aircraft. Moreover, because the attachment points must periodically be inspected for damage or corrosion, the fittings must be capable of being released and reattached to conduct the inspections.

Standard aircraft floor track comprises a channel having an inverted T-shaped cross-section typically running the length of the passenger cabin. The upper surface of the floor track channel has circular cutouts evenly spaced along the length of the channel, which allow a mounting pin to be inserted into the channel to engage the underside of the channel interior surface, thereby securing the mounting pin to the floor track channel. Multiple methods and apparatus have been proposed for providing fittings for securing equipment and seating to aircraft floor track channel. For example, U.S. Pat. No. 5,975,822 discloses a quick release fitting comprising an outer housing that is keyed to the floor track channel. The outer housing has a bore that houses a rotatable inverted T-shaped key that rotates through a 90° angle to engage the underside of the floor channel interior. The T-shaped key has a lever and a spring-loaded pin lock that allows the user to manually rotate the key and lock it into position.

Recently an improved aircraft floor track have been introduced that consists simply of a reinforced floor region having a plurality of holes evenly spaced along its longitudinal axis. The improved floor track has advantages in that it does not protrude significantly above the level of the floor, it is simpler to manufacture, and it saves weight. A disadvantage of the improved floor track, however, is the lack of access to the underside of the floor track. Accordingly, what is needed is a releasable fitting capable of engaging the blind holes of the improved aircraft floor track.

SUMMARY OF THE INVENTION

The present invention comprises a floor track fitting for securing seating or other equipment to a section of aircraft floor track that is capable of being insert through the blind holes in the floor track then wedged outward to hook onto the underside of the floor track. According to an illustrative embodiment, the floor track fitting comprises a substantially U-shaped cleat member having a pair of parallel spaced-apart legs each of which have a flat back side and a front side that is undercut to form a jaw member at the lower end thereof. A second U-shaped cleat member is placed back-to-back with the first U-shaped cleat member and a wedge or spacer is placed between the two cleat members. The wedge forces the cleat members outward against the sides of the track channel holes. With the cleat members forced outward the jaw members engage the underside of the aircraft floor track to prevent the cleat members from being withdraw from the holes. The floor track fitting also includes an upwardly extending bolt or other fastener to which the seat, bulkhead or other equipment is then attached. In the illustrative embodiment, the wedge or spacer is integral with a cover that contacts the upper surface of the floor track. When the bolt is tightened it presses down on the cover and simultaneously draws the cleat members upward against the underside of the floor track to clamp the floor track firmly between the jaw members and the cover. This clamping action of the cover and jaw members makes for a secure and rattle-free attachment.

BRIEF DESCRIPTION OF THE DRAWING

The present invention will be better understood from a reading of the following detailed description, taken in conjunction with the accompanying drawing figures in which like references designate like elements and, in which:

FIG. 3 is an exploded perspective view of a floor track fitting incorporating features of the present invention;

FIG. 4 is a perspective view of the floor track fitting of FIG. 3 in its disengaged condition;

DETAILED DESCRIPTION

Figure 1:
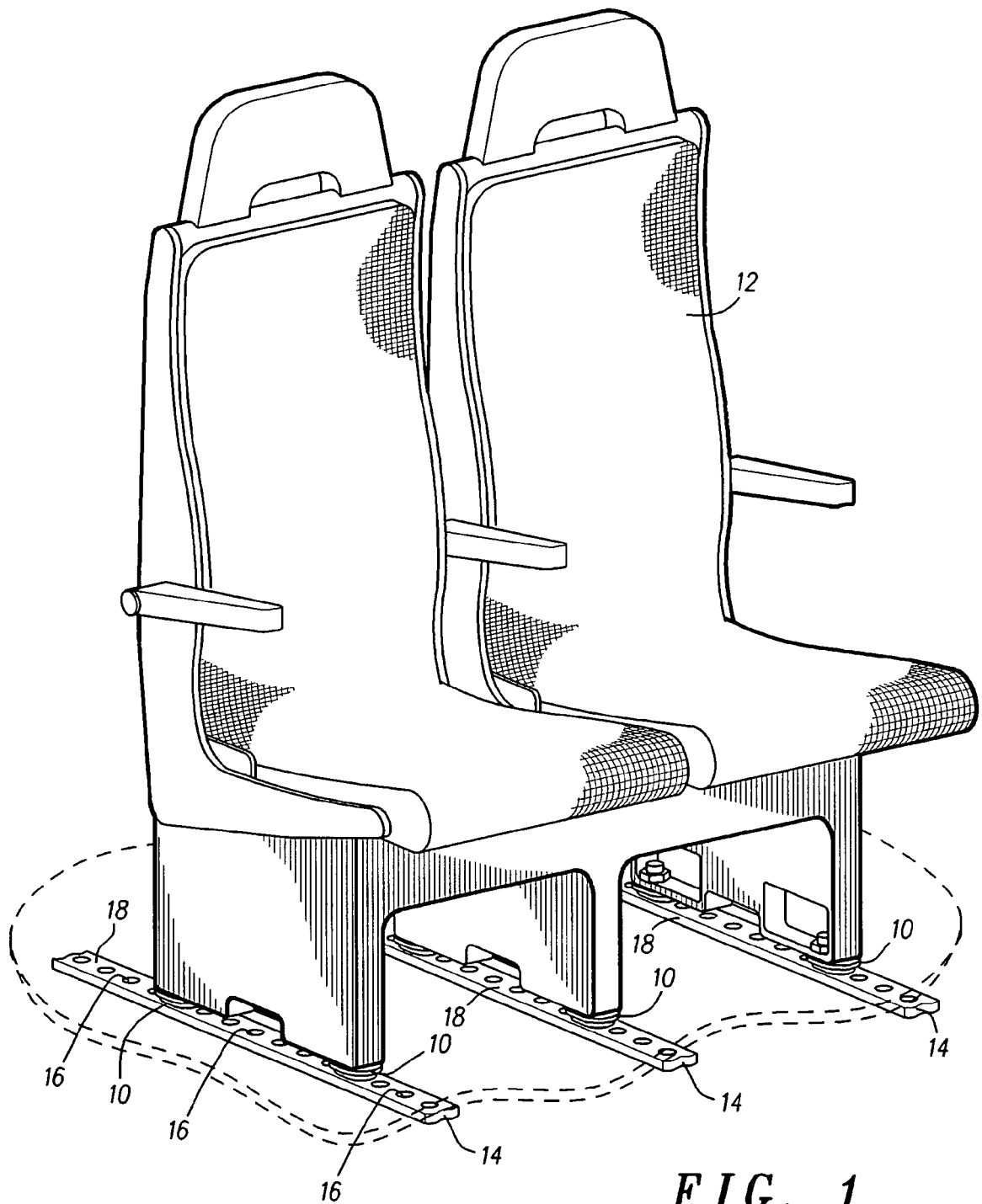
FIG. 1 is a front perspective view of an aircraft seat secured to an aircraft with a floor track fitting incorporating features of the present invention.
Figure 2:
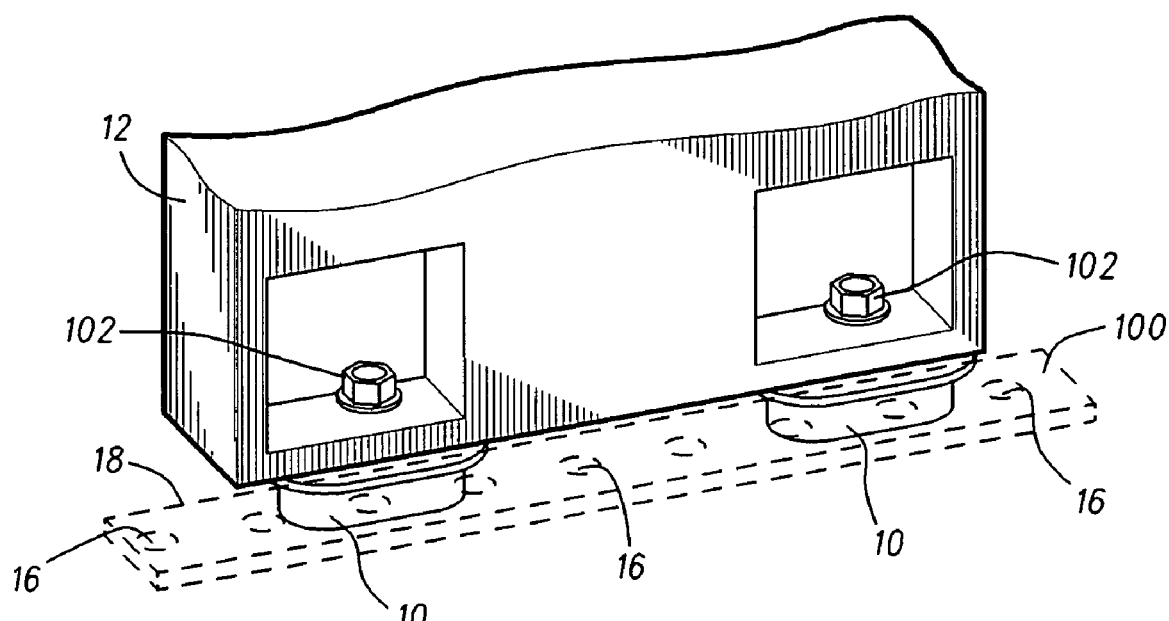
FIG. 2 is a partial perspective view of the aircraft seat of FIG. 1 attached to an aircraft floor.

With reference to FIGS. 1 and 2, a floor track fitting 10 may be advantageously used to secure equipment such as an aircraft seat 12 to an aircraft via a floor track 14 comprising a plurality of holes 16 formed in a reinforced region 18 secured to the floor of the aircraft. Reinforced region 18 may be integral with the aircraft floor or may comprise a separate plate member formed of a suitable material such as aluminum or titanium. Holes 16 are spaced at regular intervals along reinforced region 18 to enable seats or other equipment to be installed in a modular fashion. As can be seen from FIGS. 1 and 2, although the construction of the floor track 14 is significantly simplified over previous T-cross section floor track, a disadvantage is that the bottom side of the holes are inaccessible and, therefore, all connections are "blind" in that they must be made entirely from the top side of the floor track.

Figure 5:
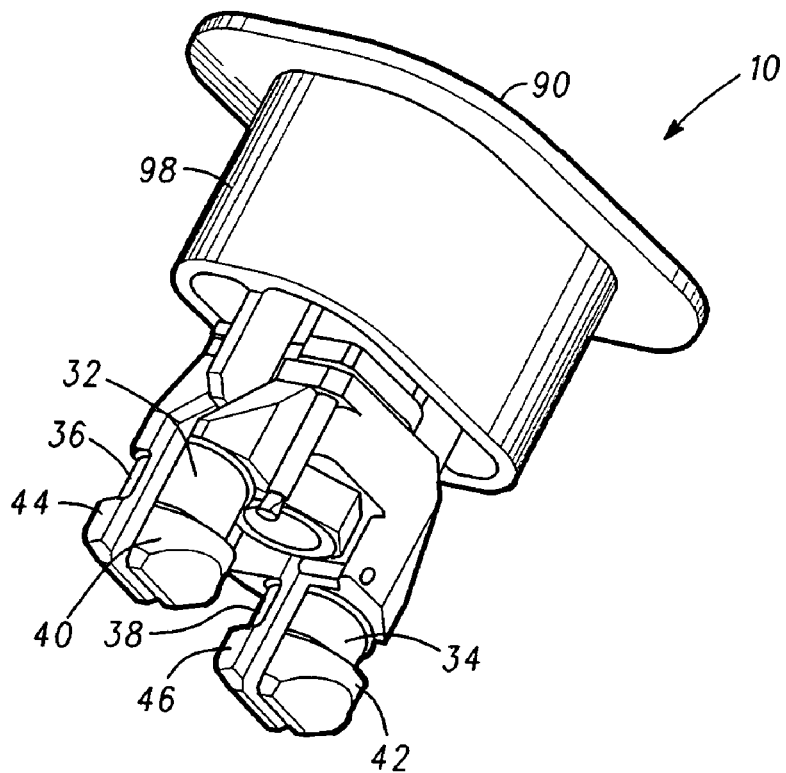
FIG. 5 is a perspective view of the floor track fitting of FIG. 3 partially engaged.

With further reference to FIGS. 3-5, floor track fitting 10 comprises a pair of substantially U-shaped cleat members 20 and 22 formed of a suitable strong, lightweight material such as stainless steel or titanium. Each of cleat members 20 and 22 is composed of a pair of leg members 24, 26, 28 and 30. Each of leg members 24-30 has a semi-circular undercut region 32, 34, 36 and 38 that is undercut to approximately the same radius as holes 16 of floor track 14. For reasons that will become apparent hereinafter, the semi-circular undercut regions 32-38 are in fact circular sectors rather than true semi-circles. Accordingly, as used herein, the terms "semi-circular" and "semi-cylindrical" include circular segments and cylindrical segments that do not extend to a full half-circle.

Each of leg members 24-30 terminates in a jaw member 40, 42, 44 and 46 having upper surfaces 48, 50, 52 and 54 that bear against the underside of floor track 14 when floor track fitting 10 is assembled thereto. Leg members 24 and 26 are connected by a substantially horizontal bridge member 56. Leg members 28 and 30 are connected by a similar bridge member 58.

For reasons that will be more fully explained hereinafter, bridge member 56 has a semi-circular depression 60 formed in the rear surface thereof. Bridge member 58 has a cantilevered flange 62 having an elliptical aperture 64. Cleat member 20 and 22 are preferably assembled into a "kit" by inserting a pin 68 through holes 70 and 72 formed in bridge members 56 and 58. The lower end of pin 68 is thereafter swaged to prevent the parts from becoming disassembled. A threaded fastener 66 passes through elliptical aperture 64 and rests against semi-circular depression 60. The head 74 of threaded fastener 66 rests against a flat surface 76 of leg member 30, which prevents threaded fastener 66 from rotating. At the same time, a roll pin 78 is inserted through a hole 80 formed in leg member 26 to retain threaded fastener 66 within the assembly. The assembly of cleat members 20 and 22 along with the captive fastener 66 comprises the "kit" hereinafter referred to as assembly 92

With particular reference to FIG. 4, floor track fitting 10 is assembled to floor track 14 by first inserting the leg members 24-30 of assembly 92 into corresponding holes 16 of floor track 14. Jaw members 40-46 of leg members 24-30 are sized to permit them to pass through holes 16 sequentially when the rear surfaces 82, 84, 86 and 88 of leg members 24-30 are in contact. Once leg members 24-30 are inserted into the holes 16 of floor track 14, a cap 90 is placed over the assembly 92. Cap 90 has a platform surface 108 with a central aperture 106 through which fastener 66 passes as cap 90 is placed over assembly 92. Cap 90 further includes a pair of downwardly extending wedge members 94-96 that wedge cleat members 22, 24 outward to form a gap between the rear surfaces 82-88 of leg members 24-30. As cap 90 is pushed further down over assembly 92, wedge members 94-96 fill this gap forcing cleat members 20 and 22 outward until the undercut regions 32-38 are firmly against the edges of holes 16 with the upper surfaces 48-54 of jaw members 40-46 bearing on the underside of floor track 14. As cap 90 is placed fully over assembly 92, the lower flange 98 of cap 90 contacts the upper surface 100 of floor track 14. A nut 102 is threaded onto the upper end of threaded fastener 66 to secure the seat 12 to the floor track fitting 10. As nut 102 is tightened, assembly 92 is drawn upward against the underside of floor track 14 while cap 90 presses downward on the upper surface of floor track 14 thereby capturing floor track 14 firmly between jaw members 40-46 and lower flange 98 of cap 90. This clamping action makes a secure and rattle-free attachment for the seat 12 or other equipment. Cap 90 may be provided with a beveled surface 104 to reduce the upward prying of bolt 66 caused by floor track 14 rolling side to side for example as the aircraft flexes in turbulence or during a hard landing.

Figure 6:
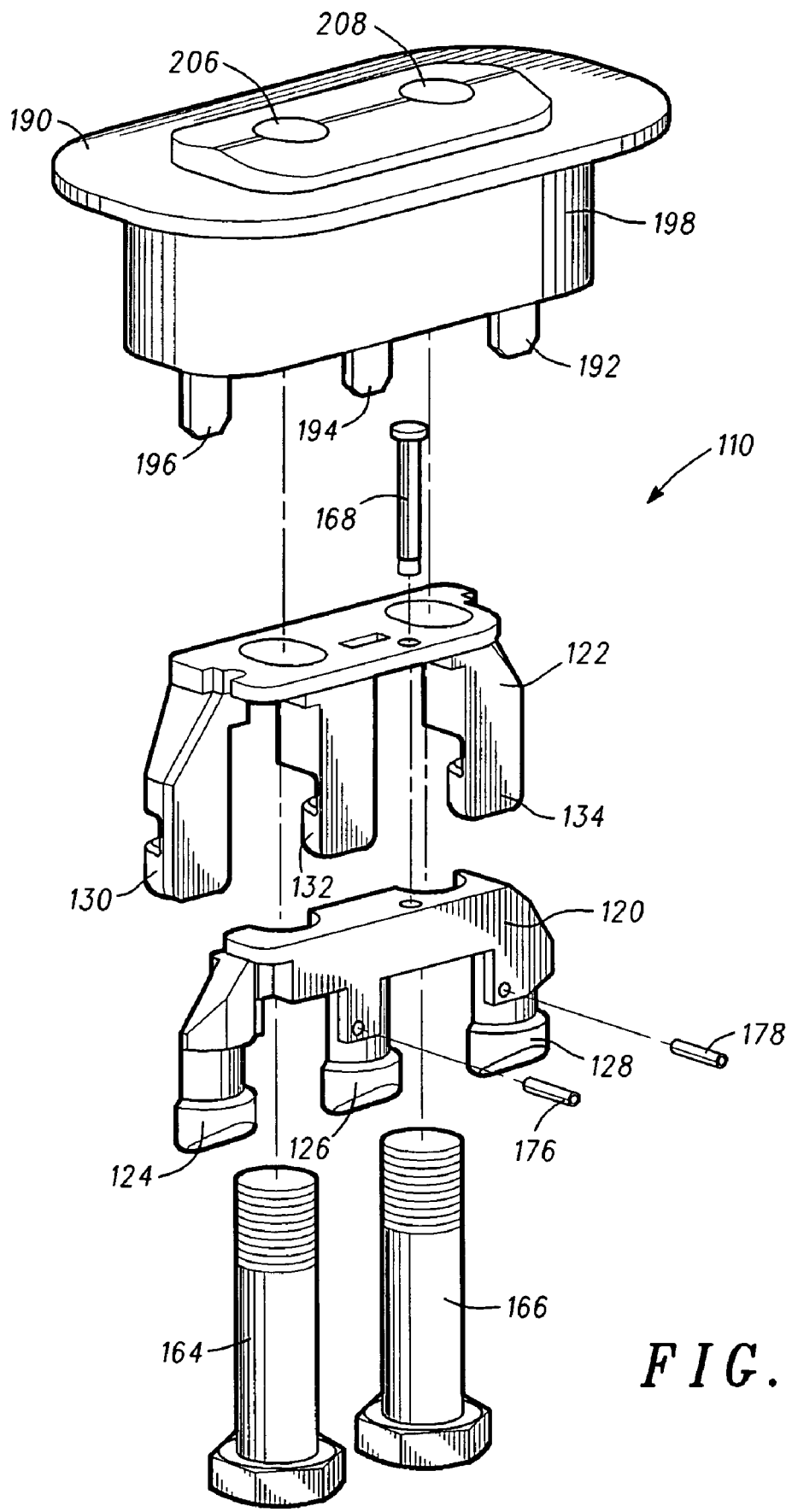
FIG. 6 is an exploded perspective view of an alternative embodiment of a floor track fitting incorporating features of the present invention.

With reference to FIG. 6, an alternative embodiment of a floor track fitting 110 is shown. In the illustrative embodiment of FIG. 6, cleat member 120 consists of three leg members 124, 126 and 128. Similarly, cleat member 122 consists of three leg members 130, 132 and 134. A single pin 168 preferably holds the two cleat members together as a "kit," while two threaded fasteners 164, 166 are retained to assembly by identical roll pins 176, 178. Cap 190 has a downwardly extending flange 198 and three wedge member 192, 194 and 196 as well as two holes 206 and 208 to permit the upper ends of threaded fasteners 164 and 166 to pass therethrough.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment of FIGS. 1-5, the cleat members were substantially U-shaped, addition of a second or additional U-shaped cleat members siamesed to the first U-shaped cleat member as shown in FIG. 6 is considered within the scope of the invention. Accordingly, as used herein the term "substantially U-shaped" includes forms consisting of multiple U-shaped members. Accordingly, it is intended that the invention shall be limited only to the extent required by the appended claims and the rules and principals of applicable law.

What is claimed is:

1. Apparatus for securing a piece of equipment to a section of aircraft floor track located on an aircraft floor, the floor track having an upper surface, a lower surface, and a plurality of holes extending through said floor track at regularly-spaced intervals along a longitudinal axis of the floor track, said apparatus comprising:

a first substantially U-shaped cleat member comprising a bridge portion and pair of parallel spaced apart leg members, each of said parallel spaced apart leg members comprising a shank portion and a jaw portion, each of said shank portions having an inward facing surface and a substantially semi-cylindrical outward facing surface, each of said shank portions further comprising a fixed end and a free end, said jaw portions each comprising a lip extending radially outward from said semi-cylindrical outward facing surface of said shank portions;

a second substantially U-shaped cleat member comprising a bridge portion and pair of parallel spaced apart leg members, each of said parallel spaced apart leg members comprising a shank portion and a jaw portion, each of said shank portions having an inward facing surface and a substantially semi-cylindrical outward facing surface, each of said shank portions further comprising a fixed end and a free end, said jaw portions each comprising a lip extending radially outward from said semi-cylindrical outward facing surface of said shank portions, said first and second cleat members capable of being positioned such that the inward facing surfaces of the shank portions of said first cleat member are parallel and spaced apart from the inward facing surfaces of the shank portions of said second cleat member, said inward facing surfaces defining a space therebetween; and a wedge member, said wedge member comprising a flange adapted to be inserted in the space between the inward facing surfaces of the shank portions of said first and second cleat members for forcing said cleat members outward against said floor track.

2. The apparatus of claim 1, wherein:
said bridge portion of said first and second substantially U-shaped cleat members each further comprise an inward facing surface, said inward facing surfaces cooperating to form an aperture for accepting a threaded fastener.

3. The apparatus of claim 2, further comprising:
a threaded fastener passing through said aperture.

4. The apparatus of claim 3, wherein:
said wedge member further comprises a platform member having an aperture sized to permit said threaded fastener to pass therethrough, said wedge member further comprising a strut member extending downward from said platform member, said strut member having a lower surface capable of bearing on one of said floor track and said aircraft floor, whereby as said threaded fastener is tightened against said platform member, said first and second substantially U-shaped cleat members are drawn upward against said floor track as said wedge member is draw downward against said floor track.

5. The apparatus of claim 1, wherein:
each of said plurality of holes in said aircraft floor track are circular and of substantially the same radius and wherein the radius of the semi-cylindrical outward facing surfaces of said shank portions are substantially equal in radius to the radius of said plurality of holes.

6. The apparatus of claim 1, further comprising:
an aircraft seat, said aircraft seat having a lower flange, said lower flange attached to said aperture by a nut threaded onto said threaded fastener.

7. Apparatus for securing a piece of equipment to a section of aircraft floor track, the floor track having an upper surface, a lower surface, and a plurality of holes extending through said floor track at regularly-spaced intervals along a longitudinal axis of the floor track, said apparatus comprising:
a first leg member comprising a first downwardly extending shank defining a lower end and an upper end, said first downwardly extending shank further comprising a first outward facing lateral surface and a first inward facing lateral surface said first leg member further comprising a first jaw member extending outward from said first outward facing lateral surface proximal the lower end of said first downwardly extending shank;
a second leg member comprising a second downwardly extending shank defining a lower end and an upper end, said second downwardly extending shank further comprising a second outward facing lateral surface and a second inward facing lateral surface, said second leg member further comprising a second jaw member extending outward from said second outward facing lateral surface proximal the lower end of said second downwardly extending shank;
a first bridge member connecting said upper end of said first leg member to said upper end of said second leg member;
a third leg member comprising a third downwardly extending shank defining a lower end and an upper end, said third downwardly extending shank further comprising a third outward facing lateral surface and a third inward facing lateral surface said third leg member further comprising a third jaw member extending outward from said third outward facing lateral surface proximal the lower end of said third downwardly extending shank, said third leg member adapted to be positioned such that said third inward facing surface is parallel and spaced apart from said first inward facing surface defining a first gap therebetween;
a fourth leg member comprising a fourth downwardly extending shank defining a lower end and an upper end, said fourth downwardly extending shank further comprising a fourth outward facing lateral surface and a fourth inward facing lateral surface said fourth leg member further comprising a fourth jaw member extending outward from said fourth outward facing lateral surface proximal the lower end of said fourth downwardly extending shank, said fourth leg member adapted to be positioned such that said fourth inward facing surface is parallel and spaced apart from said second inward facing surface defining a second gap therebetween;
a second bridge member connecting said upper end of said third leg member to said upper end of said fourth leg member;
a wedge member, said wedge member comprising a flange adapted to be inserted in said first gap for forcing said first and third leg members outward against said floor track.

8. The apparatus of claim 7, wherein:
said wedge member further comprises a second flange adapted to be inserted in said second gap for forcing said second and fourth leg members outward against said floor track.

9. The apparatus of claim 7, wherein:
said first bridge member comprises an inward facing surface, said inward facing surface having a depression therein and said second bridge member comprises a cantilever member having an aperture therethrough, said aperture and said depression cooperating to capture a threaded fastener therebetween.

10. The apparatus of claim 9, further comprising:
a threaded fastener passing through said aperture.

11. The apparatus of claim 7, wherein:
said wedge member further comprises a platform member having an aperture sized to permit said threaded fastener to pass therethrough, said wedge member further comprising a strut member extending downward from said platform member, said strut member having a lower surface capable of bearing on said floor.

12. The apparatus of claim 11, further comprising:
an aircraft seat, said aircraft seat having a lower flange, said lower flange having an aperture sized to permit said threaded fastener to pass therethrough, and
a nut member threaded onto said threaded fastener, whereby as said nut member is tightened on said threaded fastener, said lower flange bears on said platform member and said jaw members are drawn upward against said floor track as said wedge member is draw downward against said floor track capturing said floor track therebetween.

* * * * *

UNITED STATES PATENT AND TRADEMARK OFFICE
CERTIFICATE OF CORRECTION

| | |
|---|---|
| PATENT NO. | : 7,427,049 B2 |
| APPLICATION NO. | : 11/492539 |
| DATED | : September 23, 2008 |
| INVENTOR(S) | : Othar Kennedy and Don Pinkal |

Page 1 of 1

It is certified that error appears in the above-identified patent and that said Letters Patent is hereby corrected as shown below:

Col. 1 line 2 please insert at the beginning of the specification, before the first line, the following sentence:

--This application claims benefit of U.S. Provisional Application No. 60/810,545 filed on June 2, 2006.--

Signed and Sealed this

Twenty-fifth Day of November, 2008

JON W. DUDAS
*Director of the United States Patent and Trademark Office*